J. L. SCHRODE.
GLOBE VALVE.
APPLICATION FILED APR. 12, 1909.

951,970.

Patented Mar. 15, 1910.

WITNESSES:
Ch. J. Marty
Chas. F. Barcek

INVENTOR
John L. Schrode
BY
Frederick Benjamin
ATTY.

UNITED STATES PATENT OFFICE.

JOHN L. SCHRODE, OF HOPKINSVILLE, KENTUCKY, ASSIGNOR OF ONE-HALF TO FREDERICK W. NUNN, OF MARION, KENTUCKY.

GLOBE-VALVE.

951,970.  Specification of Letters Patent.  Patented Mar. 15, 1910.

Application filed April 12, 1909. Serial No. 489,439.

*To all whom it may concern:*

Be it known that I, JOHN L. SCHRODE, citizen of the United States, residing at Hopkinsville, in the county of Christian and State of Kentucky, have invented certain new and useful Improvements in Globe-Valves, of which the following is a specification.

This invention relates to improvements in valves of the type commonly known as globe-valves, and the especial object of the improvements which form the subject matter of this application is to produce a valve which can be interchangeably used either as a straightway valve or as an angle-valve, the same bonnet, gate and valve-seat being used in either adaptation of the valve.

Other objects of my improvements are to provide a valve that can be cheaply manufactured and in which the gate and its seat can be easily reground when they become worn from use, and in which the gate will have a tendency to wear the seat so that they will effectively interfit.

In the accompanying drawing I have illustrated a preferred adaptation of my invention in the following views:—

Figure 1:
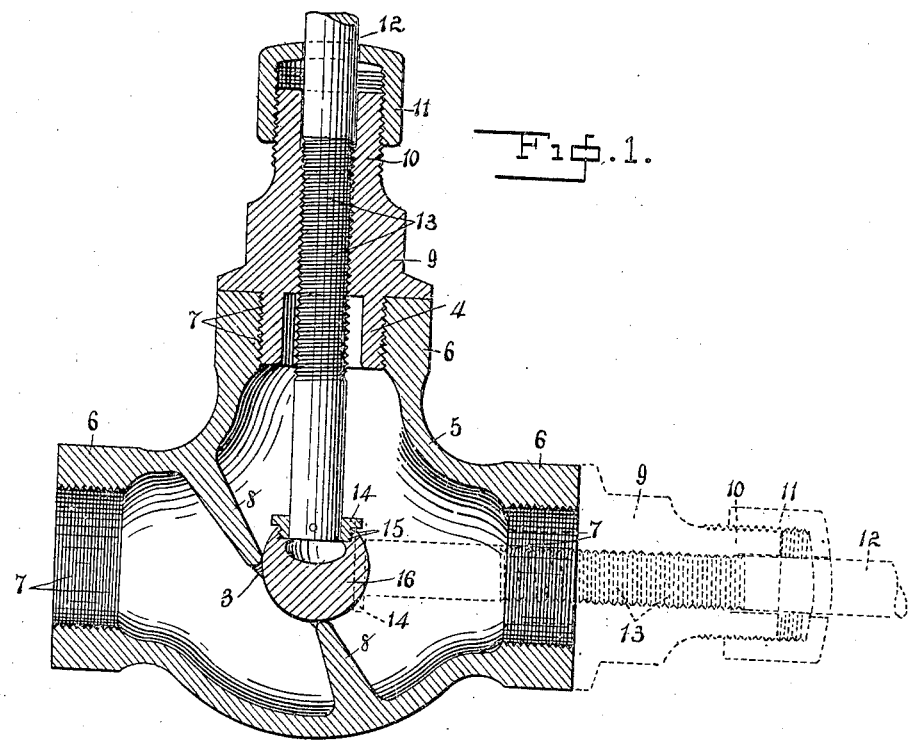
Figure 2:
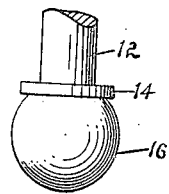

Figure 1 is a sectional view on a median line through a valve constructed according to my invention; Fig. 2 is a fragmentary view in elevation of the valve-gate and its connected stem.

Referring to the details of the drawing, 5 represents the body of a globe-valve of common form having three tubular extensions 6, each of which is provided with internal screw-threads 7 of like pitch and circumference. Extending diagonally of the interior of the body at a point that will intersect both the vertical and horizontal axes of the valve, is an integral partition 8 in which is formed an annular valve-seat 3, said partition and seat being arranged at an angle of forty-five degrees to said axes.

The bonnet 9 is of a well-known form and is provided at its inner end with a threaded extension 4 which is adapted to be screwed into any of the bores 7, and with a threaded extension 10 adapted to receive the cap-nut 11.

12 represents the valve stem which is threaded for a portion of its length as at 13 to engage the internally threaded bonnet. On the inner end of the valve stem is fixed a flanged collar 14 which is externally threaded to receive the internally threaded portion 15 of the spherical valve-gate 16. This ball gate is of suitable diameter to fully cover the seat 3 in the partition 8, and as it turns with the stem 12, has a tendency to grind an efficient face on said seat should there be any fault in the latter or in the contour of the gate.

As shown in full lines in Fig. 1, the valve is in a straightway form, and as shown by dotted lines, it is in angle-form, the change being effected by unscrewing the bonnet from the vertical extension 6, and screwing it into one of the horizontal extensions.

It will be apparent that the spherical form of the gate lends itself to being effectively seated regardless at which angle it is presented to the valve-seat, and that hence one seat is sufficient for both the straightway and the angle forms of valve.

The utility and economy of my improved valve must be apparent to anyone skilled in the art.

Having thus described my invention what I claim is:—

1. A valve composed of a body having a plurality of bonnet-receiving extensions, and having a valve-seat arranged to intersect the axes of said extensions, a bonnet adapted to be interchangeably connected with said extensions, and a valve member having a stem arranged in said bonnet and comprising a gate connected with said stem and adapted to cover said seat.

2. A valve composed of a body having a plurality of bonnet-receiving extensions arranged at angles to each other and having a valve seat arranged to intersect the axes of said extensions, a bonnet adapted to fit said extensions, a valve-member comprising a stem adjustably mounted in said bonnet and a gate detachably connected with said stem.

3. A valve composed of a body having a plurality of bonnet receiving extensions arranged at angles to each other and having a valve seat arranged to intersect the axes of said extensions, a bonnet adapted to fit said extensions, and a valve arranged to rest on said seat.

In testimony whereof I affix my signature in the presence of two witnesses.

JOHN L. SCHRODE.

Witnesses:
JOHN STITES,
H. A. ROPER.